United States Patent
Kang

(10) Patent No.: US 10,217,441 B2
(45) Date of Patent: Feb. 26, 2019

(54) METHOD FOR DISPLAYING AND ELECTRONIC DEVICE THEREOF

(71) Applicant: Samsung Electronics Co., Ltd., Gyeonggi-do (KR)

(72) Inventor: Tae-Jin Kang, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/262,504

(22) Filed: Apr. 25, 2014

(65) Prior Publication Data

US 2014/0320437 A1 Oct. 30, 2014

(30) Foreign Application Priority Data

Apr. 26, 2013 (KR) .......................... 10-2013-0046957

(51) Int. Cl.
*G09G 5/373* (2006.01)
*G09G 3/20* (2006.01)
(Continued)

(52) U.S. Cl.
CPC ............ *G09G 5/373* (2013.01); *G06F 3/0416* (2013.01); *G09G 3/20* (2013.01); *G09G 5/14* (2013.01);
(Continued)

(58) Field of Classification Search
CPC .......... G06F 3/0418; G06F 3/03; G06F 3/044; G06F 3/041; G06F 3/048; G06F 3/04886; G06F 3/0482; G06F 3/04883; G09G 2330/10; G09G 5/373; G09G 3/20; G09G 2330/00; G09G 2340/12; G09G 2340/045
(Continued)

(56) References Cited

U.S. PATENT DOCUMENTS 7,103,852 B2  9/2006  Kairis, Jr.
2007/0157094 A1*  7/2007  Lemay ................. G06F 3/0482
                                                               715/717

(Continued)

FOREIGN PATENT DOCUMENTS

CN  102609144 A  7/2012
JP     0695802 A  4/1994
(Continued)

OTHER PUBLICATIONS

International Search Report dated Aug. 7, 2014 in connection with PCT/KR2014/003482; Samsung Electronics Co., Ltd.; 3 pages.
(Continued)

*Primary Examiner* — Jennifer Mehmood
*Assistant Examiner* — James S Nokham

(57) ABSTRACT

One or more embodiments provide a method for processing and an electronic device. The display method of the electronic device can include the operations of, if a damage of a touchscreen sensing a gesture is sensed, confirming a region in which the damage of the touchscreen does not occur. The display method can also include changing the size of an output screen based on the region in which the damage of the touchscreen does not occur. The display method can also include outputting the size-changed output screen to the region in which the damage of the touchscreen does not occur. Other example embodiments are also possible.

15 Claims, 11 Drawing Sheets

(51) Int. Cl.
*G09G 5/14* (2006.01)
*G06F 3/041* (2006.01)

(52) U.S. Cl.
CPC ..... *G09G 2330/00* (2013.01); *G09G 2330/10* (2013.01); *G09G 2330/12* (2013.01); *G09G 2340/045* (2013.01); *G09G 2340/0464* (2013.01)

(58) Field of Classification Search
USPC ................ 345/173–174; 715/765, 823, 838; 178/18.06
See application file for complete search history.

(56) References Cited

U.S. PATENT DOCUMENTS

| | | | |
|---|---|---|---|
| 2009/0049395 A1* | 2/2009 | Lee et al. ...................... | 715/765 |
| 2009/0184935 A1 | 7/2009 | Kim | |
| 2010/0235793 A1* | 9/2010 | Ording ................. | G06F 1/1626 715/863 |
| 2010/0293508 A1* | 11/2010 | Hwang ............... | G06F 3/04886 715/846 |
| 2011/0167366 A1* | 7/2011 | Wagner ................ | G06F 3/0483 715/765 |
| 2011/0197153 A1* | 8/2011 | King ................... | G06F 3/04883 715/769 |
| 2011/0291974 A1* | 12/2011 | Son ...................... | G06F 3/0489 345/173 |
| 2011/0320978 A1* | 12/2011 | Horodezky et al. .......... | 715/823 |
| 2012/0072871 A1* | 3/2012 | Seo et al. ..................... | 715/838 |
| 2012/0162112 A1* | 6/2012 | Cho ..................... | G06F 3/0482 345/173 |
| 2013/0021273 A1* | 1/2013 | Lee .................... | G06F 3/04883 345/173 |
| 2013/0044070 A1 | 2/2013 | Townsend et al. | |
| 2013/0100037 A1* | 4/2013 | Mabie ................... | G06F 3/0418 345/173 |
| 2013/0147727 A1* | 6/2013 | Lee et al. ...................... | 345/173 |
| 2013/0153393 A1* | 6/2013 | Omote ................... | G06F 3/044 200/600 |
| 2013/0187861 A1* | 7/2013 | Lavallee ....................... | 345/173 |
| 2013/0234987 A1* | 9/2013 | Ye et al. ....................... | 345/174 |
| 2014/0146070 A1 | 5/2014 | Liu et al. | |
| 2014/0159764 A1* | 6/2014 | Al-Dahle ........... | G01R 31/2853 324/762.01 |
| 2014/0253494 A1* | 9/2014 | Jiang ..................... | G06F 3/0418 345/174 |
| 2015/0242067 A1* | 8/2015 | Ainslie ................. | G06F 3/0482 715/815 |

FOREIGN PATENT DOCUMENTS

| | | |
|---|---|---|
| KR | 10-2012-0049517 | 5/2012 |
| KR | 10-2012-0078355 | 7/2012 |
| KR | 10-2012-0100508 | 9/2012 |
| WO | WO 2012151882 A1 | 11/2012 |

OTHER PUBLICATIONS

Written Opinion dated Aug. 7, 2014 in connection with PCT/KR2014/003482; Samsung Electronics Co., Ltd.; 5 pages.
European Patent Office, "Supplementary European Search Report,"Application No. 14788929.9-1904, dated Nov. 21, 2016, 8 pages, publisher EPO, Munich, Germany.
Office Action dated Jun. 2, 2017 in connection with Chinese Patent Application No. 201480023711.9.
European Patent Office Communication regarding Application No. 14788929.9, dated Dec. 11, 2017, 5 pages.

* cited by examiner

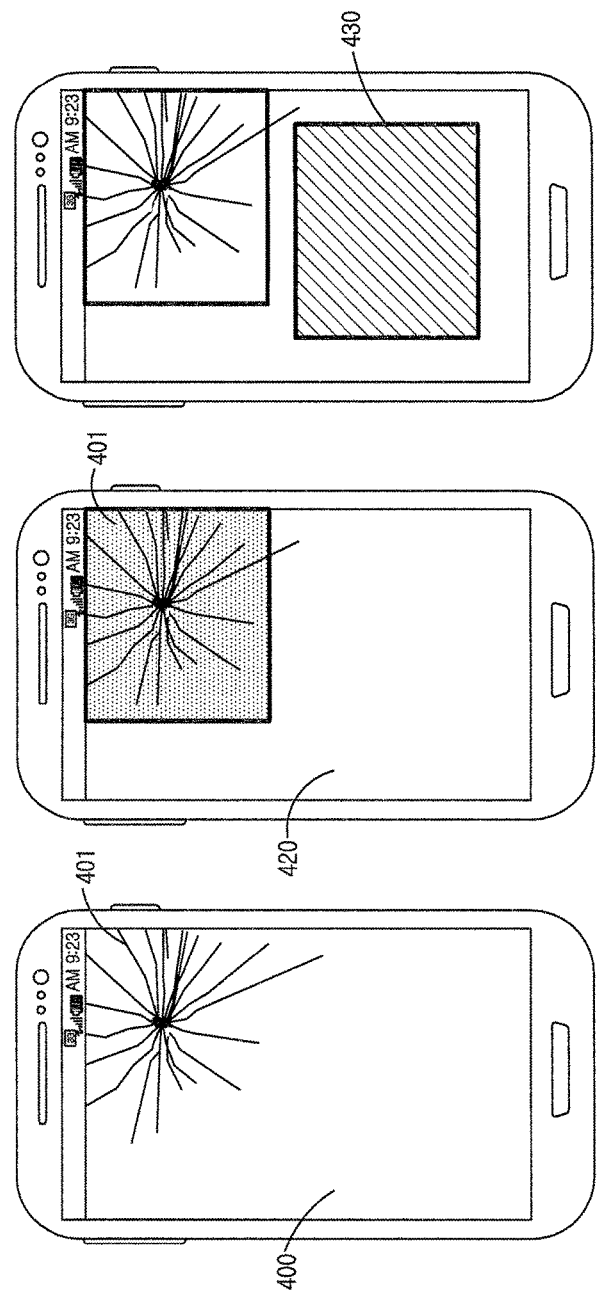

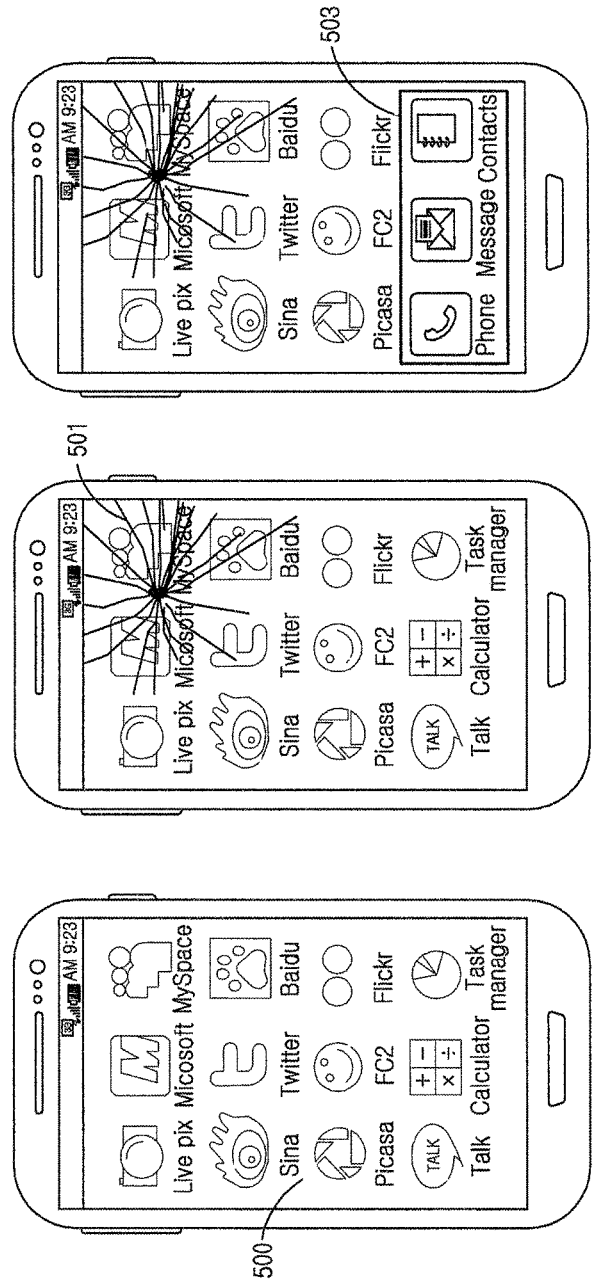

FIG.11A ~1101

| Ch | Tx0 | Tx1 | Tx2 | Tx3 | Tx4 | Tx5 | Tx6 | Tx7 | Tx8 | Tx9 | Tx10 | Tx11 | Tx12 | Tx13 | Tx14 | Tx15 | Tx16 | Tx17 | Tx18 |
|---|---|---|---|---|---|---|---|---|---|---|---|---|---|---|---|---|---|---|---|
| Rx0 | | | | | | | | | | | | | | | | | | | |
| Rx1 | | | | | | | | | | | | | | | | | | | |
| Rx2 | 1746 | 1047 | 2205 | 1721 | 1955 | 745 | 1842 | 1032 | 1650 | 988 | 1499 | 746 | 1502 | 637 | 1420 | 704 | 1535 | 629 | 810 |
| Rx3 | 1877 | 1847 | 2215 | 933 | 1898 | 910 | 1771 | 1099 | 1622 | 1108 | 1464 | 861 | 1374 | 749 | 1263 | 806 | 1441 | 777 | 793 |
| Rx4 | 1775 | 1521 | 2196 | 949 | 1902 | 917 | 1773 | 1108 | 1621 | 1117 | 1469 | 861 | 1383 | 753 | 1271 | 810 | 1448 | 781 | 794 |
| Rx5 | | | | | | | | | | | | | | | | | | | |
| Rx6 | | | | | | | | | | | | | | | | | | | |
| Rx7 | | | | | | | | | | | | | | | | | | | |
| Rx8 | | | | | | | | | | | | | | | | | | | |
| Rx9 | | | | | | | | | | | | | | | | | | | |
| Rx10 | | | | | | | | | | | | | | | | | | | |
| Rx11 | | | | | | | | | | | | | | | | | | | |

FIG.11B ~1103

| Ch | Tx0 | Tx1 | Tx2 | Tx3 | Tx4 | Tx5 | Tx6 | Tx7 | Tx8 | Tx9 | Tx10 | Tx11 | Tx12 | Tx13 | Tx14 | Tx15 | Tx16 | Tx17 | Tx18 |
|---|---|---|---|---|---|---|---|---|---|---|---|---|---|---|---|---|---|---|---|
| Rx0 | | | | | | | | | | | | | | | | | | | |
| Rx1 | | | | | | | | | | | | | | | | | | | |
| Rx2 | 1680 | 552 | 2196 | 537 | 1940 | 579 | 1852 | 608 | 1893 | 616 | 1885 | 617 | 1592 | 583 | 1452 | 672 | 1580 | 630 | 844 |
| Rx3 | 980 | 824 | 305 | 290 | 177 | 201 | 149 | 185 | 163 | 41 | 43 | 32 | 35 | 30 | 33 | 33 | 35 | 29 | 25 |
| Rx4 | 850 | 1353 | 534 | 685 | 420 | 566 | 404 | 522 | 446 | 389 | 355 | 382 | 299 | 284 | 268 | 328 | 294 | 347 | 162 |
| Rx5 | | | | | | | | | | | | | | | | | | | |
| Rx6 | | | | | | | | | | | | | | | | | | | |
| Rx7 | | | | | | | | | | | | | | | | | | | |
| Rx8 | | | | | | | | | | | | | | | | | | | |
| Rx9 | | | | | | | | | | | | | | | | | | | |
| Rx10 | | | | | | | | | | | | | | | | | | | |
| Rx11 | | | | | | | | | | | | | | | | | | | |

METHOD FOR DISPLAYING AND ELECTRONIC DEVICE THEREOF

PRIORITY

The present application is related to and claims priority under 35 U.S.C. § 119(a) to a Korean Patent Application filed in the Korean Intellectual Property Office on Apr. 26, 2013 and assigned Serial No. 10-2013-0046957, the contents of which are herein incorporated by reference.

TECHNICAL FIELD

The present disclosure relates to a method for displaying and an electronic device thereof.

BACKGROUND

With the recent sudden growth of electronic devices, electronic devices making possible wireless voice call and information exchange have become the necessaries of life. In the beginning of supply of the electronic devices, the electronic devices were simply recognized as being portable and making wireless call possible. But, with the development of technologies and the introduction of the wireless Internet, the electronic devices are satisfying user's desires by gradually increasing the scope of use such as a game, a remote controller using short-range communication, and image taking with a digital camera as well as simple telephony, schedule management and the like.

As the electronic devices provide multimedia services as above, information quantitation processed and information quantitation to display are increasing. According to this, attention is being increasingly paid to an electronic device with a touchscreen capable of improving a space utility and increasing the size of a display unit.

The touchscreen refers to an input/output device performing input/output of information in one screen. According to this, if the electronic device uses the touchscreen, the electronic device can increase a display area because removing a separate input device such as a keypad. For example, if the electronic device employs a full touch method in which the touchscreen is applied to the entire screen of the electronic device, the electronic device can increase the size of a screen because using the entire surface of the electronic device as the screen.

FIGS. 1A and 1B illustrate a diagram illustrating a general electronic device with a touchscreen.

The electronic device 100 is making use of the touchscreen as a display means and input means.

That is, the electronic device 100 has the touchscreen playing roles of an input unit and a display unit as illustrated in FIG. 1A.

This touchscreen, which can sense a user's gesture, can sense a gesture of drag, tap, flick and the like of an external input means such as a user's finger, an electronic pen or the like.

This electronic device 100 can designate a displayed icon to a position in which a gesture 101 is sensed, and execute an application corresponding to the icon.

In the illustrated drawing, a shadowed icon 103 represents an icon selected by the gesture 101.

If impact is applied to the electronic device 100, the touchscreen is damaged (101) as illustrated in FIG. 1B. If it becomes a situation in which a touch sensor cannot operate as the touchscreen is damaged, the electronic device 100 cannot sense a gesture 120 at a damaged portion of the touchscreen.

SUMMARY

To address the above-discussed deficiencies, it is a primary object to provide a method and apparatus capable of changing a display method if a gesture insensible region is generated in a touchscreen in an electronic device according to one example embodiment of the present disclosure.

Another aspect of the present disclosure is to provide a method and apparatus capable of changing the size of a display screen if a gesture insensible region is generated in a touchscreen in an electronic device according to one example embodiment of the present disclosure.

A further aspect of the present disclosure is to provide a method and apparatus capable of displaying an object for function execution in a gesture sensible region if a gesture insensible region is generated in a touchscreen in an electronic device according to one example embodiment of the present disclosure.

The above aspects are achieved by providing a method for processing and an electronic device thereof.

According to various example embodiments of the present disclosure, a method for displaying in an electronic device can include the operations of, if a damage of a touchscreen is sensed, confirming a region in which the damage of the touchscreen does not occur. The method also includes changing the size of an output screen based on the region in which the damage of the touchscreen does not occur. The method also includes outputting the size-changed output screen to the region in which the damage of the touchscreen does not occur.

According to various example embodiments, an electronic device can include at least one processor for executing computer programs, a memory for storing data and instructions, and at least one program stored in the memory and configured to be executable by the at least one processor. The program can include an instruction of, if a damage of a touchscreen is sensed, processing to confirm a region in which the damage of the touchscreen does not occur. The program can also include an instruction of changing the size of an output screen based on the region in which the damage of the touchscreen does not occur. The program can also include an instruction of outputting the size-changed output screen to the region in which the damage of the touchscreen does not occur.

According to various example embodiments, a computer-readable storage media can store one or more programs for executing the operations of, if a damage of a touchscreen is sensed, confirming a region in which the damage of the touchscreen does not occur, changing the size of an output screen based on the region in which the damage of the touchscreen does not occur, and outputting the size-changed output screen to the region in which the damage of the touchscreen does not occur.

According to various example embodiments of the present disclosure, a method in an electronic device comprises displaying a first region of a touch screen. The method also includes sensing damage in a first display region of a touchscreen. The method also includes displaying a second display region in the touchscreen based on the sensing the damage in the first display region of the touchscreen. The second region includes a portion of the first region.

According to various example embodiments of the present disclosure, a method in an electronic device comprising sensing damage in a touchscreen. The method also includes displaying an output screen based on the sensed damage in the touchscreen wherein the output screen includes a non-damaged screen in the touch screen.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A to 4C illustrate a diagram showing a display region of an electronic device according to various example embodiments of the present disclosure;

FIGS. 5A to 5C illustrate a diagram showing a display screen of an electronic device according to various example embodiments of the present disclosure;

FIGS. 11A and 11B illustrate a diagram showing an example of determining an input disable region of a touchscreen according to various example embodiments of the present disclosure.

DETAILED DESCRIPTION

FIGS. 2 through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Various embodiments of the present disclosure will be described herein below with reference to the accompanying drawings. In the following description, well-known functions or constructions are not described in detail since they would obscure the various embodiments in unnecessary detail. And, terms described below, which are defined considering functions in the present disclosure, can be different depending on user and operator's intention or practice. Therefore, the terms should be defined on the basis of the disclosure throughout this specification.

Below, a description will be made for a method and apparatus for changing a display method if an input disable region exists in a touchscreen in an electronic device according to various example embodiments of the present disclosure.

Here, the input disable region of the touchscreen refers to a region incapable of sensing a normal touch input and, in contrast, an input enable region can define a region capable of sensing the normal touch input.

Further, changing the display method can be displaying in the input enable region a picture displayed in the input disable region.

The electronic device according to various example embodiments of the present disclosure can move an object (e.g., icon) included in the input disable region, to the input enable region.

Further, the electronic device according to various example embodiments of the present disclosure can adjust the size of a display screen suitably to the input enable region and display the size-adjusted display screen.

Also, in the present specification, gesture refers to forming a touch pattern in a touchscreen of the electronic device. Touch is carried out on the touchscreen of the electronic device with an external input means such as a user's finger, an electronic pen, or the like. The gesture represents that a drag of a certain pattern is performed in a state in which a touch and hold is performed on the touchscreen. In an embodiment, the gesture also represents performing a touch-and-drag and a release of a touch.

Further, the electronic device can be a portable electronic device, or can be a device such as a portable terminal, a mobile phone, a media player, a tablet computer, a handheld computer, or a Personal Digital Assistant (PDA). In addition, the electronic device may be home appliances that are connectable with other devices through a communication function.

Also, the electronic device may be any portable electronic device including a device combining two or more functions among these devices.

Figure 1B:
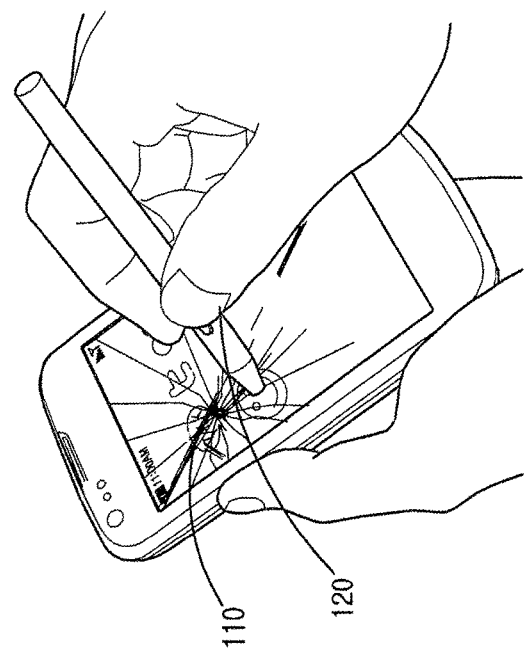
FIGS. 1A and 1B illustrate a diagram showing a general electronic device with a touchscreen.
Figure 1A:
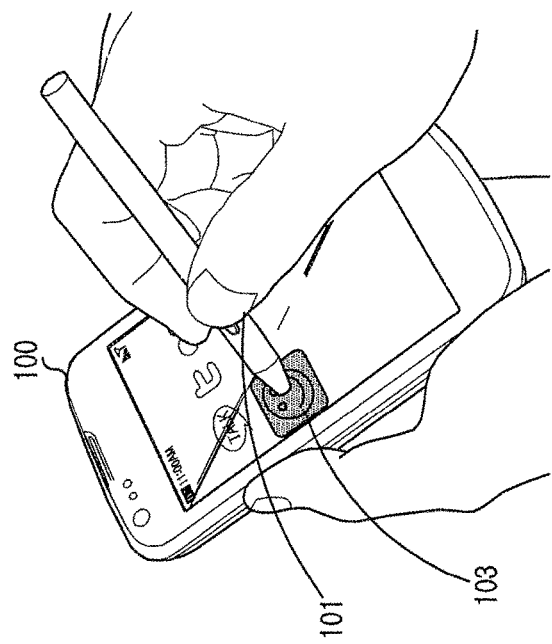
Figure 2:
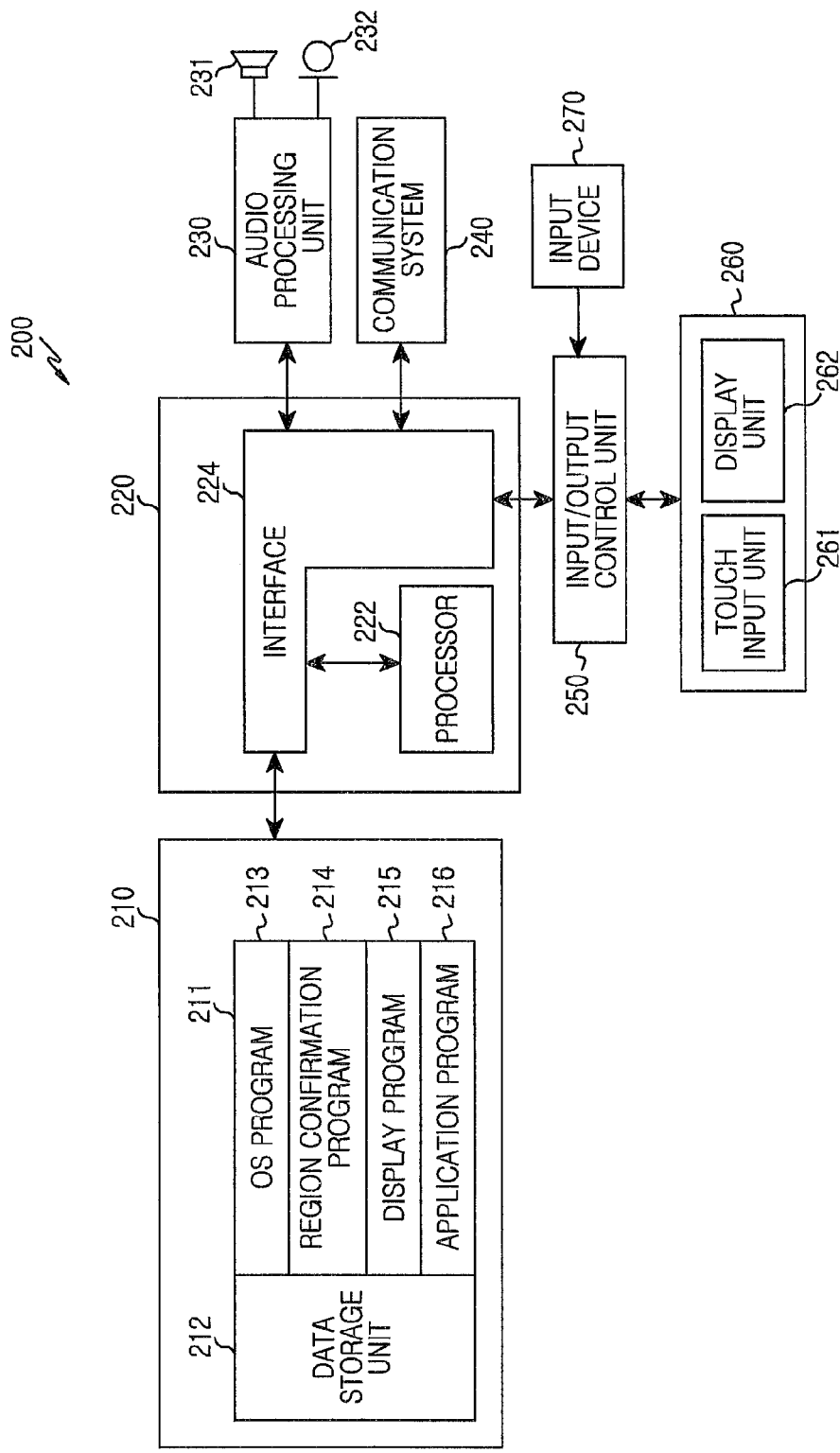
FIG. 2 illustrates a block diagram showing a construction of an electronic device according to various example embodiments of the present disclosure.

FIG. 2 illustrates a block diagram showing a construction of an electronic device according to an example embodiment the present disclosure.

As illustrated in FIG. 2, the electronic device 200 can include a memory 210, a processor unit 220, an audio processing unit 230, a communication system 240, an input/output control unit 250, a touchscreen 260, and an input device 270. Here, the memory 210 and the communication system 240 may exist in plural.

Each constituent element is described as follows.

The memory 210 can include a program storage unit 211 storing a program for controlling the operation of the electronic device 200 and a data storage unit 212 storing data generated during program execution. For example, the data storage unit 212 can store various updateable storage data such as a phone book, a sending message or a receiving message, and can store a reference value for determining an input disable region and an input enable region in the touchscreen 260 according to one example embodiment of the present disclosure. The reference value stored in the data storage unit 212 can be a sensitivity variation of a reception channel to a signal of a transmission channel, defined for a situation in which input is not generated, a situation in which input is generated, a situation in which touch disable occurs and the like.

Further, if the input disable region is generated in the touchscreen 260, the data storage unit 212 can store information about an object displayable in the input enable region.

Further, if the input disable region is generated in the touchscreen 260, the data storage unit 212 can store the size of a display screen being adjusted according to the size of the input enable region.

Also, the program storage unit 211 can include an Operating System (OS) program 213, a region confirmation program 214, a display program 215, and at least one application program 216. Here, the programs stored in the program storage unit 211 are sets of instructions, and may be expressed as instruction sets.

The OS program 213 can include various software constituent elements controlling general system operation. This control of the general system operation can represent, for example, memory management and control, storage hardware (device) control and management, power control and management and the like. The OS program 213 can perform even a function of making smooth communication between various hardware (devices) and program constituent elements (modules).

The region confirmation program 214 can include at least one or more software constituent elements for monitoring a status of the touchscreen 260.

The region confirmation program 214 determines if an input disable region being a gesture insensible region exists in the touchscreen 260. The region confirmation program 214 can generate a signal through a transmission channel constituting the touchscreen 260, confirm a sensitivity variation of a signal sensed in a reception channel, and determines the existence or non-existence of the input disable region.

That is, the region confirmation program 214 can generate a signal by each transmission channel of the touchscreen 260 and, if a reception channel receives a signal less than a predefined sensitivity, the region confirmation program 214 can determine that the reception channel is the input disable region.

Further, if the input disable region (i.e., gesture insensible region) exists in the touchscreen 260, the region confirmation program 124 can confirm an input enable region (i.e., gesture sensible region).

This operation of the region confirmation program 214 can be carried out by an IC (Integrated Circuit) (i.e., a Touch Screen Panel IC (TSP IC)) controlling the touchscreen 260.

The display program 215 can include various software constituent elements for providing and displaying a graphic on the touchscreen 260. The term of 'graphics' can be used as meaning including a text, a web page, an icon, a digital image, a video, an animation and the like.

Further, the display program 215 can include various software constituent elements related to a user interface.

That is, if a gesture insensible region is generated in the touchscreen 260, the display program 215 can process to change a display method for display.

Here, changing the display method refers to displaying in a gesture sensible region an object for function execution. The display program 215 can display in the input enable region (i.e., gesture sensible region) an object (e.g., an icon) having been displayed in the input disable region (i.e., gesture insensible region).

The display program 215 can display an object for executing an essential function of the electronic device 200, in the input enable region.

Also, the display program 215 can display an object for executing a supplementary function of the electronic device 200, in the input enable region. Here, the supplementary function of the electronic device 200 can be an application installed in the electronic device 200. Also, the display program 216 can display in the input enable region the objects for executing the essential function and the supplementary function of the electronic device 200, together.

Also, the display program 215 can display a list of objects for settable functions in the input enable region.

Further, the display program 215 can adjust the size of a display screen suitably to the size of the input enable region and display the size-adjusted display screen.

Further, the display program 215 can display in a pop-up form an object displayed in the input enable region, and can make the object displayed in the pop-up form disappear or again display the disappearing object.

The application program 216 can include a software constituent element for at least one application program installed in the electronic device 200.

The OS program 213, region confirmation program 214, and display program 215 stored in the program storage unit 211 can be composed of modules having hardware constructions, and these modules can be expressed as sets of control units.

The processor unit 220 can include at least one processor 222 or interface 224. Here, the processor 222 or interface 224 can be integrated as at least one integrated circuit or be implemented as separate constituent elements.

The interface 224 can perform a role of a memory interface controlling the access of the processor 222 and the memory 210.

Further, the interface 224 can perform a role of a peripheral interface controlling the connection of the processor 222 with a peripheral input/output device of the electronic device 200.

If a gesture insensible region is generated in the touchscreen 260, the processor 222 can control the electronic device 200 to change a display method using at least one software program. The processor 222 can control to execute at least one program stored in the memory 210 and perform a function corresponding to the corresponding program. For example, the processor 222 can include a graphical processor for, if a gesture insensible region is generated in the touchscreen 260, changing the size of a display screen or displaying an object for function execution in a gesture sensible region.

The audio processing unit 230 can provide an audio interface between a user and the electronic device 200 through a speaker 231 and a microphone 232.

The communication system 240 can perform a communication function for voice communication and data communication of the electronic device 200. The communication system 240 may be divided into a plurality of communication sub modules supporting different communication networks. For example, the communication network can include, although not limited to, a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Local Area Network (WLAN), a Bluetooth network, Near Field Communication (NFC) and the like.

The input/output control unit 250 can provide interface between the interface 224 and an input/output device such as the touchscreen 260, the input device 270 and the like.

The touchscreen 260, which is an input/output device performing output of information or input of information, can include a touch input unit 261 and a display unit 262.

Further, the touchscreen 260 can include an IC (i.e., TSP IC) controlling the touchscreen 260 and determine if an input disable region (i.e., gesture insensible region) exists.

The touch input unit 261 can provide touch information, which is sensed through a touch panel, to the processor unit 220 through the input/output control unit 250. The touch input unit 261 is for changing the touch information into an instruction structure such as touch_down, touch_move and touch_up and providing the instruction structure to the processor unit 220. According to one example embodiment, the touch input unit 261 can generate input data for selecting an object displayed in an input enable region of the touchscreen 260, input data for making the displayed object disappear, input data for displaying the disappearing object, and the like. That is, the touch input unit 261 can generate input data for controlling the object displayed in the input enable region of the touchscreen 260.

The display unit 262 can display status information of the electronic device 200, a character inputted by a user, a moving picture, a still picture, and the like. For example, if a gesture insensible region is generated due to the damage of the touchscreen 260, the display unit 262 can display an input enable region in which a size-adjusted display screen is displayed.

Further, if a gesture insensible region is generated due to the damage of the touchscreen 260, the display unit 262 can display an input enable region in which an object for function execution of the electronic device 200 is displayed.

The input device 270 can provide input data generated by user's selection, to the processor unit 220 through the input/output control unit 250. For example, the input device 270 may only include a control button for control of the electronic device 200. For another example, the input device 270 is composed of a keypad for receiving input data from a user. According to one example embodiment, the input device 270 can generate input data for selecting an object displayed in an input enable region of the touchscreen 260, input data for making the displayed object disappear, input data for displaying the disappearing object, and the like. That is, the input device 270 can perform the same operation as the touch input unit 261 generating input data for controlling the object displayed in the input enable region of the touchscreen 260.

Although not illustrated, the electronic device 200 can further include constituent elements for providing supplementary functions such as a camera module for image or video taking, a broadcast receiving module for broadcast reception, a digital sound source playback module such as an MPEG Audio Layer-3 (MP3) module, a short-range wireless communication module for short-range wireless communication, a proximity sensor module for proximity sensing and the like, and software for operations thereof.

According to various example embodiments, an electronic device can include at least one processor for executing computer programs, a memory for storing data and instructions, and at least one program stored in the memory and configured to be executable by the at least one processor. The program can include an instruction of, if a damage of a touchscreen sensing a gesture is sensed, processing to confirm a region in which the damage of the touchscreen does not occur, change the size of an output screen based on the region in which the damage of the touchscreen does not occur, and output the size-changed output screen to the region in which the damage of the touchscreen does not occur.

According to various example embodiments, the program can include an instruction of processing to change the size of a screen composed of a predefined object for function execution.

According to various example embodiments, the program can include an instruction of processing to change the size of a screen composed of an object for executing a function related to communication of the electronic device.

According to various example embodiments, the program can include an instruction of processing to change the size of a screen composed of an object for executing at least one application additionally installed in the electronic device.

According to various example embodiments, the program can include an instruction of processing to add an object for function execution to the size-changed output screen.

According to various example embodiments, the program can include an instruction of processing to confirm the region in which the damage of the touchscreen built in a cover glass arranged in the top of the electronic device does not occur.

According to various example embodiments, the program can include an instruction of processing to output an output screen of a pop-up form.

According to various example embodiments, the program can include an instruction of processing to confirm a damaged region of the touchscreen based on a sensitivity variation of a signal generated through a transmission channel of the touchscreen and a signal sensed in a reception channel.

According to various example embodiments, the electronic device can include a processor for processing to confirm a damaged region of the touchscreen 260 sensing a gesture, and change a display method if the damaged region of the touchscreen 260 is confirmed. By changing the display method, the processor can process to use a region in which a damage of the touchscreen 260 does not occur, as a display region.

Figure 3:
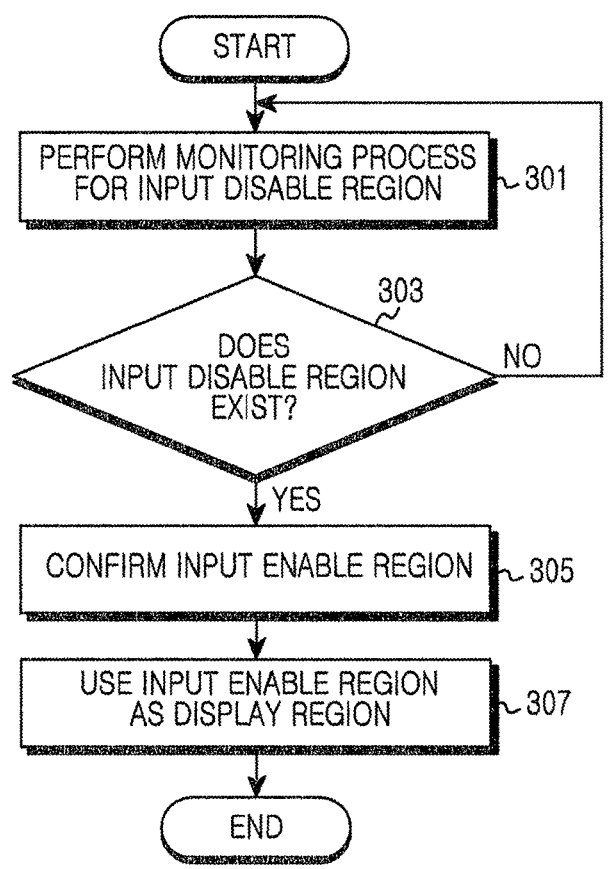
FIG. 3 illustrates a process of a procedure of displaying in an electronic device according to various example embodiments of the present disclosure.

FIG. 3 illustrates a process of a procedure of displaying in an electronic device according to various example embodiments of the present disclosure.

Referring to FIG. 3, the electronic device has a touchscreen performing roles of an input unit and a display unit. This touchscreen can be defined as a cover-glass integrated touchscreen which has a cover glass arranged in the top of the electronic device and embeds a function capable of sensing a user's gesture according to one example embodiment of the present disclosure.

First, in operation 301 the electronic device can perform a monitoring process for the touchscreen. Here, the monitoring process for the touchscreen is a process of determining if an input disable region incapable of sensing a user's gesture exists in the touchscreen. Generally, the cover-glass integrated touchscreen has touch sensors vapor-deposited on the cover glass. If the cover glass is damaged, a touch sensor of a damaged portion cannot operate normally. According to one example embodiment, the input disable region can be a region in which the touch sensor does not normally operate due to the damage of the cover glass.

According to this, the electronic device confirms the input disable region in which the touchscreen cannot normally operate, through an IC (i.e., TSP IC) controlling the touchscreen.

The TSP IC can confirm the input disable region based on a sensitivity variation of a signal generated through a transmission channel of the touchscreen and a signal sensed in a reception channel.

If a sensitivity of the signal sensed in the reception channel is abnormally deteriorated or the sensitivity variation is problematic throughout the channel, the TSP IC can determine that the input disable region exists in the touchscreen.

The TSP IC can confirm a reference sensitivity predefined for a situation in which input is not generated, a situation in which input is generated, and a situation in which touch disable Occurs.

According to this, the TSP IC can generate a signal by each transmission channel of the touchscreen and, if a reception channel receives a signal less than a predefined sensitivity, the TSP IC can determine that the reception channel is the input disable region.

After that, in operation 303, the electronic device performing the monitoring process for the touchscreen as above can determine if the input disable region exists in the touchscreen.

When it is determined in operation 303 that the input disable region does not exist in the touchscreen, the electronic device can again perform a process of operation 301.

Meantime, when it is determined in operation 303 that the input disable region exists in the touchscreen, in operation 305, the electronic device can confirm an input enable region.

Here, the input enable region, which is a region capable of normally sensing a user's gesture, can be commonly a region excepting the input disable region in the entire region of the touchscreen.

Next, in operation 307, the electronic device can process to use the input enable region as a display region.

That is, when the input disable region exists in the touchscreen, the electronic device can display in the input enable region an object (e.g., icon) for executing an essential function of the electronic device.

For another example, when the input disable region exists in the touchscreen, the electronic device can display in the input enable region an object which cannot be selected by a user's gesture because the object is displayed in the input disable region.

The electronic device can display in a pop-up form the object in the input enable region. This is because, when the object displayed in the input disable region is added to the input enable region, other object can have been already displayed in the input enable region. If displaying the object in the input enable region in the pop-up form as above, the electronic device can make the object displayed in the pop-up form disappear and then, select even the originally displayed object. Undoubtedly, the electronic device can display a menu of making the displayed object of the pop-up form appear and a menu of again popping up the disappearing menu.

For another example, when an input disable region exists in the touchscreen, the electronic device can adjust the size of a display screen suitably to the size of an input enable region and display the size-adjusted display screen. In a situation where the electronic device adjusts the size of the display screen, the electronic device can sense a user's gesture for an object which has ever existed in the input disable region, although an object constituting the display screen can decrease in size.

FIGS. 4A to 4C illustrate a diagram showing a display region of an electronic device according to various example embodiments of the present disclosure.

The electronic device has a touchscreen performing roles of an input unit and a display unit. This touchscreen can be defined as a cover-glass integrated touchscreen which has a cover glass arranged in the top of the electronic device and embeds a function capable of sensing a user's gesture according to one example embodiment of the present disclosure.

The electronic device having this touchscreen can perform a monitoring process for the touchscreen and determine if an input disable region incapable of sensing a user's gesture exists in the touchscreen.

The cover-glass integrated touchscreen has touch sensors vapor-deposited on the cover glass. If a cover glass 400 is damaged as illustrated in FIG. 4A, a touch sensor of a damaged portion 401 cannot normally operate and thus the electronic device cannot normally sense a user's gesture.

If a damage of the touchscreen is confirmed, the electronic device can confirm an input disable region 401 and an input enable region 420 as illustrated in FIG. 4. The electronic device confirms a damaged region of the touchscreen, a damage form thereof and the like and divides a region capable of sensing the user's gesture and a region incapable of sensing the user's gesture.

This electronic device can use the input enable region 420 as a display region 430 as illustrated in FIG. 4C.

The electronic device can display a menu for executing an operation of the electronic device in an input enable region, and perform an operation corresponding to a user's gesture. However, because the electronic device cannot sense the user's gesture in an input disable region, the electronic device cannot perform an operation of a menu existing in the input disable region, so the electronic device displays the menu in the input enable region.

FIGS. 5A to 5C illustrate a diagram showing a display screen of an electronic device according to various example embodiments of the present disclosure.

The electronic device has a touchscreen performing roles of an input unit and a display unit. This touchscreen can be defined as a cover-glass integrated touchscreen which has a cover glass arranged in the top of the electronic device and embeds a function capable of sensing a user's gesture according to one example embodiment of the present disclosure.

The electronic device having this touchscreen can perform a monitoring process for the touchscreen and determine if an input disable region incapable of sensing a user's gesture exists in the touchscreen.

The cover-glass integrated touchscreen has touch sensors vapor-deposited on the cover glass. If the cover glass is damaged, a touch sensor of a damaged portion cannot normally operate and thus the electronic device cannot normally sense a user's gesture.

That is, according to FIG. 5A, the electronic device can display (500) a display screen through the touchscreen. The display screen can include icons of various applications as illustrated.

Generally, the electronic device can sense a user's gesture on the touchscreen.

The gesture sensed by the electronic device can represent that a drag of a certain pattern is performed in a state in which a touch and hold is performed on the touchscreen of the electronic device with an external input means such as a user's finger, an electronic pen or the like. In an embodiment, the gesture can represent performing a touch-and-drag and a release of a touch.

In addition, the gesture can be a meaning inclusive of operations of tap and flick.

That is, the electronic device can execute an application corresponding to an icon that is displayed in a position in which a user's gesture is sensed. Further, according to the present disclosure, the electronic device can perform the monitoring process for the touchscreen and determine if the input disable region incapable of sensing the user's gesture exists in the touchscreen.

If impact is applied to the electronic device, the touchscreen is damaged (501) as illustrated in FIG. 5B. A damaged portion of the touchscreen becomes the input disable region incapable of sensing the user's gesture.

If the input disable region is generated as above, the electronic device according to various example embodiments of the present disclosure can use an input enable region as a display region 503 as illustrated in FIG. 5C.

The illustrated drawing illustrates a situation of displaying in the input enable region an object for executing an essential function of the electronic device.

Generally, if an input disable region is generated in the touchscreen, the electronic device disables an operation of a touch sensor of the input disable region because the touch sensor of the input disable region cannot normally operate.

In this embodiment, as a user cannot use a function of the electronic device with the touchscreen, the electronic device enables a touch sensor of an input enable region, and displays the object for executing the essential function in the input enable region in which the touch sensor normally operates.

Figures 6A, 6B, 6C:
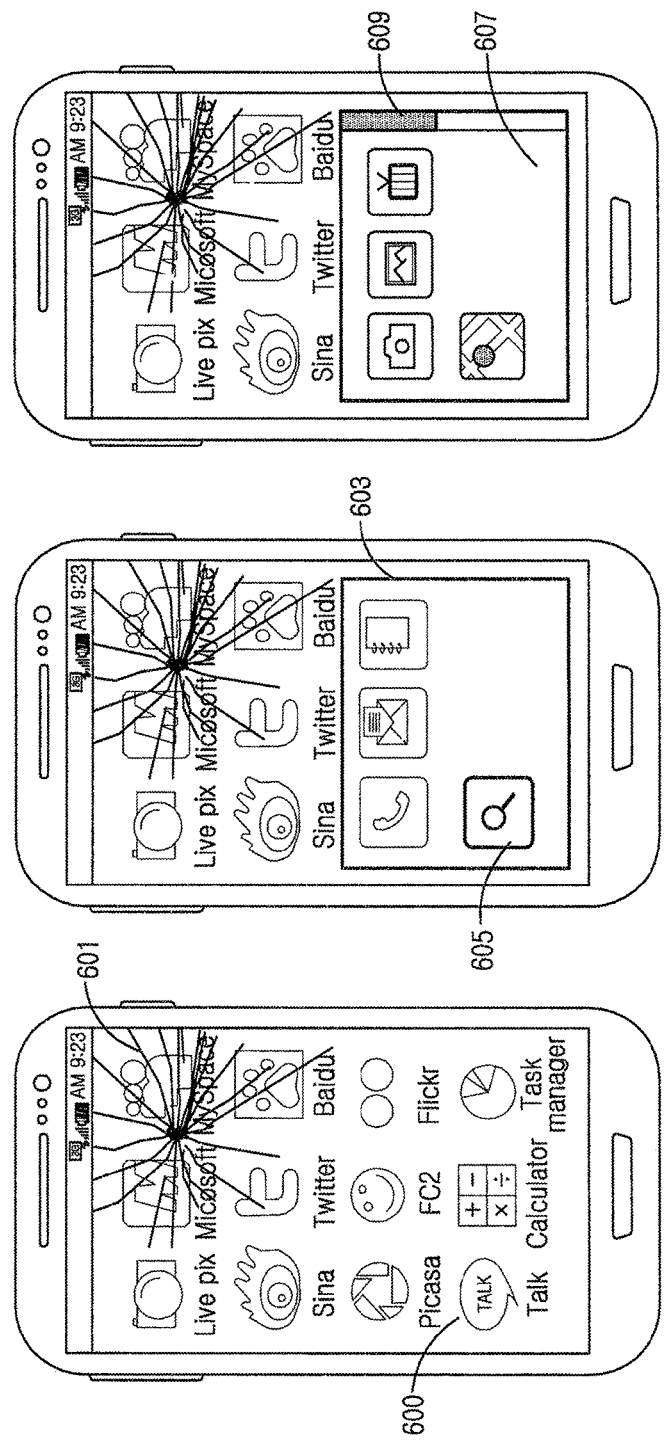
FIGS. 6A to 6C illustrate a diagram showing another display screen of an electronic device according to various example embodiments of the present disclosure.

FIGS. 6A to 6C illustrate a diagram showing another display screen of an electronic device according to various example embodiments of the present disclosure.

The electronic device has a touchscreen performing roles of an input unit and a display unit. This touchscreen can be defined as a cover-glass integrated touchscreen which has a cover glass arranged in the top of the electronic device and embeds a function capable of sensing a user's gesture according to one example embodiment of the present disclosure.

The electronic device having this touchscreen can perform a monitoring process for the touchscreen and determine if an input disable region incapable of sensing a user's gesture exists in the touchscreen.

The cover-glass integrated touchscreen has touch sensors vapor-deposited on the cover glass. If the cover glass is damaged, a touch sensor of a damaged portion cannot normally operate and thus the electronic device cannot normally sense a user's gesture.

That is, the electronic device can display a display screen through the touchscreen. The display screen can include icons of various applications as illustrated.

Generally, the electronic device can sense a user's gesture on the touchscreen.

The gesture sensed by the electronic device can represent that a drag of a certain pattern is performed in a state in which a touch and hold is performed on the touchscreen of the electronic device with an external input means such as a user's finger, an electronic pen or the like. In an embodiment, the gesture can represent performing a touch-and-drag and a release of a touch.

In addition, the gesture can be a meaning inclusive of operations of tap and flick.

That is, the electronic device can execute an application corresponding to an icon that is displayed in a position in which a user's gesture is sensed. Further, according to the present disclosure, the electronic device can perform the monitoring process for the touchscreen and determine if the input disable region incapable of sensing the user's gesture exists in the touchscreen.

If impact is applied to the electronic device, the touchscreen 600 is damaged (601) as illustrated in FIG. 6A. A damaged portion 601 of the touchscreen 600 becomes the input disable region incapable of sensing the user's gesture.

If the input disable region is generated as above, the electronic device according to various example embodiments of the present disclosure can use an input enable region 603 as a display region as illustrated in FIG. 6B.

The illustrated drawing illustrates a situation of displaying not merely an object for executing an essential function of the electronic device but also an object 605 for selecting a supplementary function of the electronic device, together.

Here, the supplementary function of the electronic device, which is a function accepting a predefined essential function, can include an application installed by a user.

If the touchscreen is damaged, the electronic device performing the operation of the example embodiment of FIG. 5 may execute only the predefined function. But, although the touchscreen is damaged, the electronic device performing the operation of example embodiment of FIG. 6 can execute various supplementary functions desired by a user.

That is, if the electronic device senses a gesture of selecting an object for selecting a supplementary function, the electronic device can display a list (607) of executable supplementary functions as illustrated in FIG. 6C. For one example, the electronic device can display icons of previously installed applications.

Due to the input disable region, the touchscreen of the electronic device can decrease a space for displaying the supplementary function. According to this, the electronic device can display the list of supplementary functions using a scroll function 609 when the electronic device cannot display the entire list of supplementary functions in the input enable region.

FIGS. 7A to 7D illustrate a diagram showing a further display screen of an electronic device according to various example embodiments of the present disclosure.

The electronic device has a touchscreen performing roles of an input unit and a display unit. This touchscreen can be defined as a cover-glass integrated touchscreen which has a cover glass arranged in the top of the electronic device and embeds a function capable of sensing a user's gesture according to one example embodiment of the present disclosure.

The electronic device having this touchscreen can perform a monitoring process for the touchscreen and determine if an input disable region incapable of sensing a user's gesture exists in the touchscreen.

The cover-glass integrated touchscreen has touch sensors vapor-deposited on the cover glass. If the cover glass is damaged, a touch sensor of a damaged portion cannot normally operate and thus the electronic device cannot normally sense a user's gesture.

That is, the electronic device can display a display screen through the touchscreen. The display screen can include icons of various applications as illustrated.

Generally, the electronic device can sense a user's gesture on the touchscreen.

The gesture sensed by the electronic device can represent that a drag of a certain pattern is performed in a state in which a touch and hold is performed on the touchscreen of the electronic device with an external input means such as a user's finger, an electronic pen or the like. In an embodiment, the gesture can represent performing a touch-and-drag and a release of a touch.

In addition, the gesture can be a meaning inclusive of operations of tap and flick.

That is, the electronic device can execute an application corresponding to an icon that is displayed in a position in which a user's gesture is sensed. Further, according to the present disclosure, the electronic device can perform the monitoring process for the touchscreen and determine if the input disable region incapable of sensing the user's gesture exists in the touchscreen.

Figure 7A:
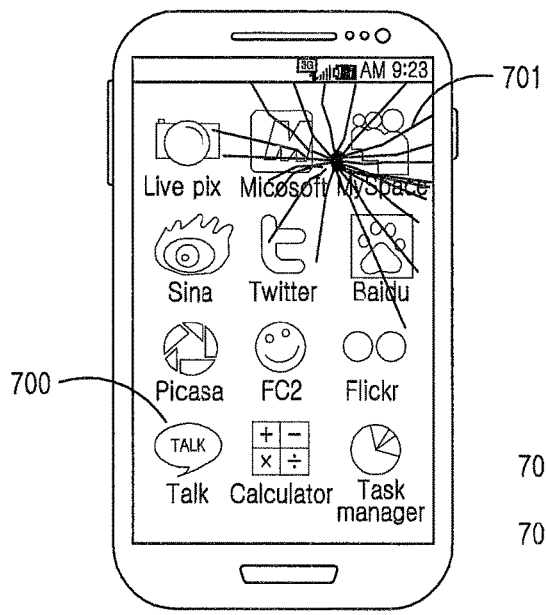
FIGS. 7A to 7D illustrate a diagram showing a further display screen of an electronic device according to various example embodiments of the present disclosure.

If impact is applied to the electronic device, the touchscreen 700 is damaged (701) as illustrated in FIG. 7A. A damaged portion 701 of the touchscreen 700 becomes the input disable region incapable of sensing the user's gesture.

Figure 7B:
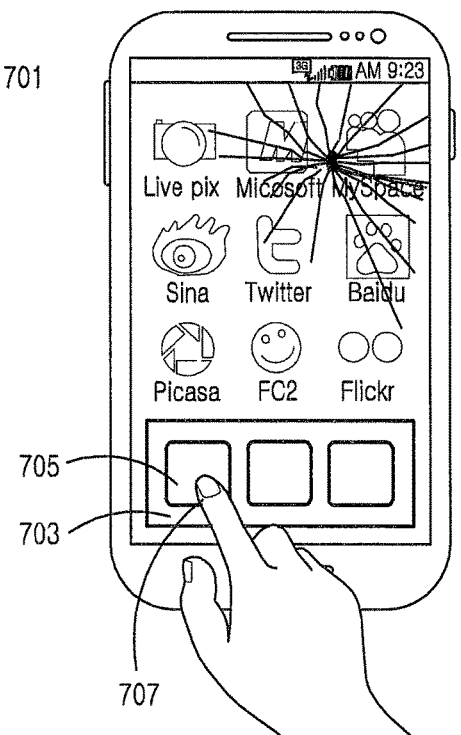

If the input disable region is generated as above, the electronic device according to various example embodiments of the present disclosure can use an input enable region as a display region 703 as illustrated in FIG. 7B.

The illustrated drawing illustrates a situation of being able to add an object used by a user to the input enable region.

That is, in the illustrated drawing, three regions 705 represent regions to which an object selected by a user can be added, and it is currently a state where no added object exists in the input enable region.

Figure 7C:
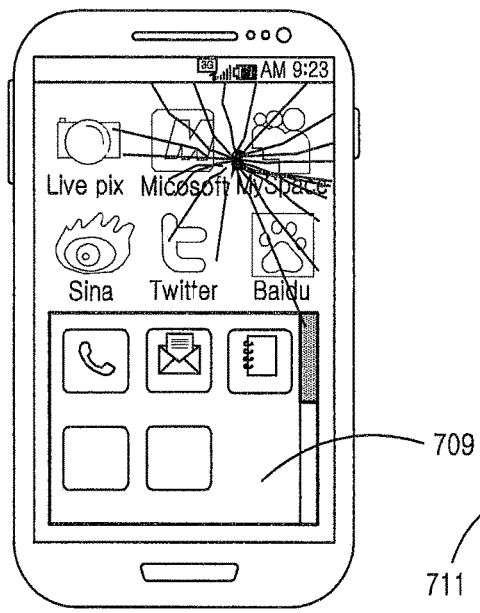

Further, when the electronic device senses a gesture 707 of selecting a region to add an object as illustrated in FIG. 7B, the electronic device can display (709) a list of functions addable to the input enable region as illustrated in FIG. 7C. The electronic device can display a list of essential functions of the electronic device. Further, the electronic device can display a list of supplementary functions together with the list of essential functions.

Figure 7D:
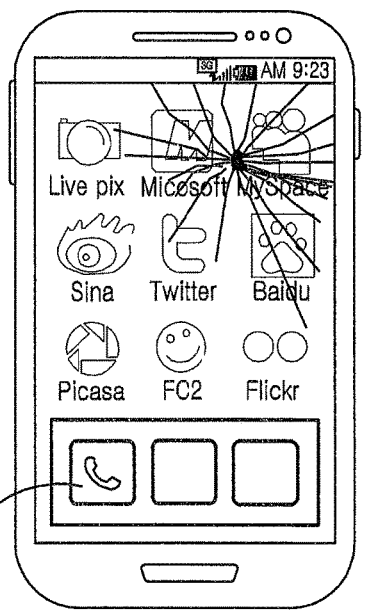

When the electronic device senses a gesture of selecting a function intended to be added among the displayed list, the electronic device can add the selected function to a corresponding region. This situation is illustrated in FIG. 7D. FIG. 7D illustrates a situation in which a phone function selected by a user is added (711).

In the example embodiment of FIGS. 7A to 7D, when the touchscreen is damaged, the electronic device adds the function desired by the user to the input enable region, but the electronic device may change a function already set to the input enable region into the function desired by the user.

Figure 8C:
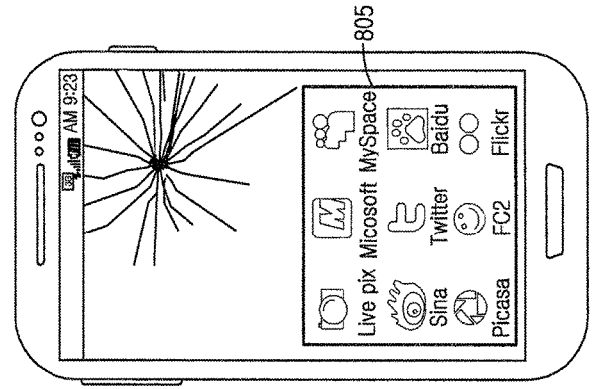
FIGS. 8A to 8C illustrate a diagram showing a yet another display screen of an electronic device according to various example embodiments of the present disclosure.
Figure 8B:
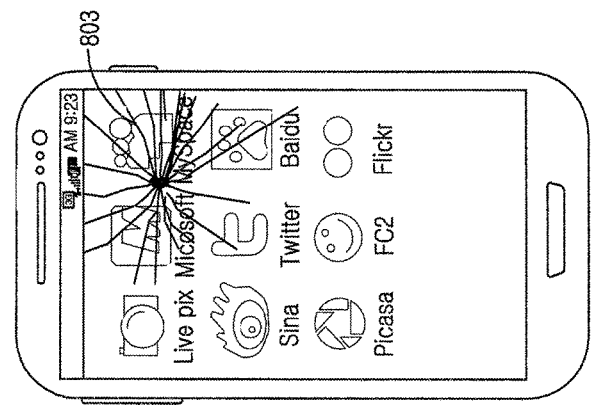
Figure 8A:
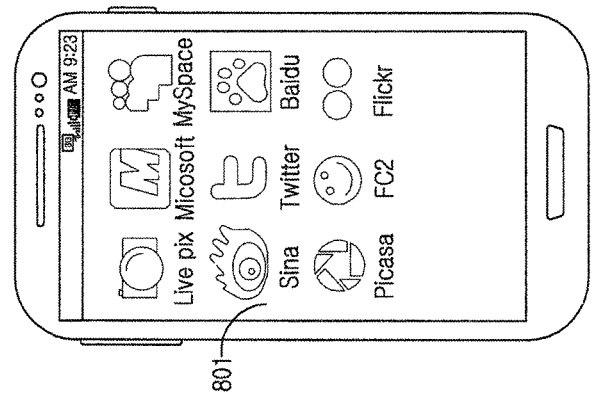

FIGS. 8A to 8C illustrate a diagram showing yet another display screen of an electronic device according to various example embodiments of the present disclosure.

The electronic device has a touchscreen performing roles of an input unit and a display unit. This touchscreen can be defined as a cover-glass integrated touchscreen which has a cover glass arranged in the top of the electronic device and embeds a function capable of sensing a user's gesture according to one example embodiment of the present disclosure.

The electronic device having this touchscreen can perform a monitoring process for the touchscreen and determine if an input disable region incapable of sensing a user's gesture exists in the touchscreen.

The cover-glass integrated touchscreen has touch sensors vapor-deposited on the cover glass. If the cover glass is damaged, a touch sensor of a damaged portion cannot normally operate and thus the electronic device cannot normally sense a user's gesture.

That is, according to FIG. 8A, the electronic device can display (801) a display screen through the touchscreen. The display screen can include icons of various applications as illustrated.

Generally, the electronic device can sense a user's gesture on the touchscreen.

The gesture sensed by the electronic device can represent that a drag of a certain pattern is performed in a state in which a touch and hold is performed on the touchscreen of the electronic device with an external input means such as a user's finger, an electronic pen or the like. In an embodiment, the gesture can represent performing a touch-and-drag and a release of a touch.

In addition, the gesture can be a meaning inclusive of operations of tap and flick.

That is, the electronic device can execute an application corresponding to an icon that is displayed in a position in which a user's gesture is sensed. Further, according to the present disclosure, the electronic device can perform the monitoring process for the touchscreen and determine if the input disable region incapable of sensing the user's gesture exists in the touchscreen.

If impact is applied to the electronic device, the touchscreen can be damaged (803) as illustrated in FIG. 8B. A damaged portion of the touchscreen becomes the input disable region incapable of sensing the user's gesture.

If the input disable region is generated as above, the electronic device according to various example embodiments of the present disclosure can use an input enable region as a display region 805 as illustrated in FIG. 8C.

The illustrated drawing illustrates a situation of, after adjusting the size of the display screen of the electronic device suitably to the size of the input enable region, displaying the size-adjusted display screen.

Figure 9:
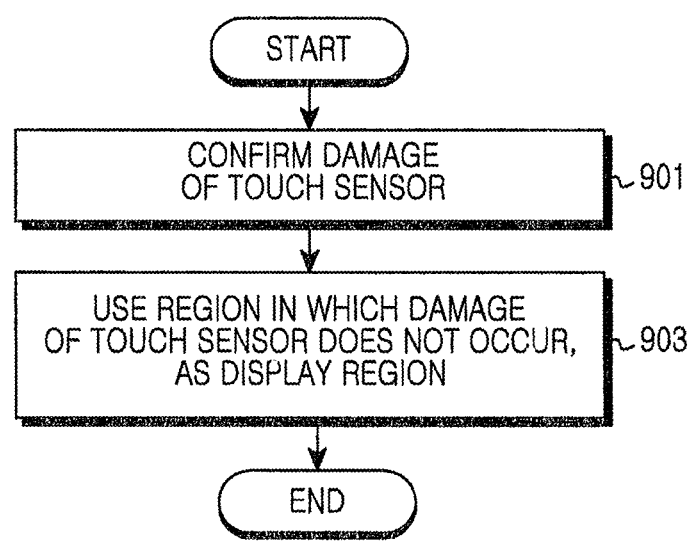
FIG. 9 illustrates a process of a procedure of changing a display region in an electronic device according to various example embodiments of the present disclosure.

FIG. 9 illustrates a process of a procedure of changing a display region in an electronic device according to various example embodiments of the present disclosure.

Referring to FIG. 9, the electronic device has a touchscreen performing roles of an input unit and a display unit. This touchscreen can be defined as a cover-glass integrated touchscreen which has a cover glass arranged in the top of the electronic device and embeds a function capable of sensing a user's gesture according to one example embodiment of the present disclosure.

The electronic device having this touchscreen can perform a monitoring process for the touchscreen and determine if an input disable region incapable of sensing a user's gesture exists in the touchscreen.

The cover-glass integrated touchscreen has touch sensors vapor-deposited on the cover glass. If the cover glass is damaged, a touch sensor of a damaged portion cannot normally operate and thus the electronic device cannot normally sense a user's gesture.

According to this, in operation 901, the electronic device can confirm a damage of the touch sensor. The electronic device confirms a region incapable of sensing a gesture because the touch sensor is damaged.

After that, in operation 903, the electronic device can use a region, in which no touch sensor is damaged, as a display region.

Here, using the region in which no touch sensor is damaged as the display region can be displaying an object (e.g., icon) for executing an essential function of the electronic device in the region in which no touch sensor is damaged, when a touch sensor of the touchscreen is damaged.

Further, it can be displaying an object (e.g., icon) displayed in a region in which a touch sensor is damaged, in a region in which no touch sensor is damaged.

Further, it can be adjusting the size of a display screen suitably to a region in which no touch sensor is damaged and displaying the size-adjusted display screen.

Figure 10:
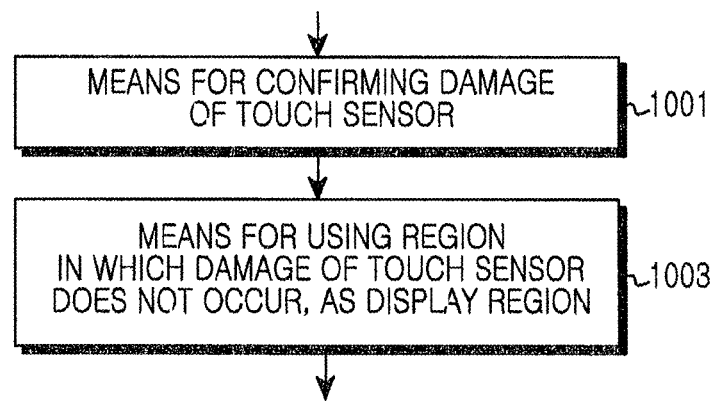
FIG. 10 illustrates a diagram showing a construction of an electronic device according to various example embodiments of the present disclosure.

FIG. 10 illustrates a diagram showing a construction of an electronic device according to various example embodiments of the present disclosure.

Referring to FIG. 10, the electronic device has a touchscreen performing roles of an input unit and a display unit. This touchscreen can be defined as a cover-glass integrated touchscreen which has a cover glass arranged in the top of the electronic device and embeds a function capable of sensing a user's gesture according to one example embodiment of the present disclosure.

The electronic device having this touchscreen can perform a monitoring process for the touchscreen and determine if an input disable region incapable of sensing a user's gesture exists in the touchscreen.

The cover-glass integrated touchscreen has touch sensors vapor-deposited on the cover glass. If the cover glass is damaged, a touch sensor of a damaged portion cannot normally operate and thus the electronic device cannot normally sense a user's gesture.

According to this, the electronic device can include a means 1001 for confirming a damage of the touch sensor. The means 1001 confirms a region incapable of sensing a gesture because the touch sensor is damaged.

Further, the electronic device can include a means 1003 for using a region in which no touch sensor is damaged, as a display region.

Here, if the means 1003 uses the region in which no touch sensor is damaged as the display region, when a touch sensor of the touchscreen is damaged, the means 1003 can display an object (e.g., icon) for executing an essential function of the electronic device in the region in which no touch sensor is damaged.

Further, the means 1003 can display an object (e.g., icon) displayed in a region in which a touch sensor is damaged, in a region in which no touch sensor is damaged.

Further, the means 1003 can adjust the size of a display screen suitably to a region in which no touch sensor is damaged and display the size-adjusted display screen.

FIGS. 11A and 11B illustrate a diagram showing an example of determining an input disable region of a touchscreen according to various example embodiments of the present disclosure.

An IC (TSP IC) controlling the touchscreen can confirm an input disable region based on a sensitivity variation of a signal generated through a transmission channel of the touchscreen and a signal sensed in a reception channel.

The TSP IC can confirm the sensitivity variation of the reception channel to the signal of the transmission channel, defined for a situation in which input is not generated, a situation in which input is generated, and a situation in which touch disable occurs.

That is, according to FIG. 11A, the TSP IC can confirm a sensitivity variation 1101 of the reception channel to a signal of the transmission channel. This sensitivity variation can be a reference value for determining a normal operation of the touchscreen. The sensitivity variation of the reception channel to the signal of the transmission channel can be previously defined and stored.

For example, when sensing a signal corresponding to a sensitivity defined according to FIG. 11A in the reception channel of the touchscreen, the TSP IC can determine that the touchscreen normally operates.

If the signal sensitivity sensed in the reception channel of the touchscreen is abnormally deteriorated or the sensitivity variation is problematic throughout the channel, the TSP IC can determine that an input disable region exists in the touchscreen.

For example, if the TSP IC senses (1103) a signal having a difference with the sensitivity variation (i.e., reference value) of FIG. 11A in a reception channel 3 or 4 according to FIG. 11B, the TSP IC can determine that input may be impossible for the reception channel 3 or 4 of the touchscreen.

Referring to FIG. 11A, the reception channel 3 has to receive a signal corresponding to a sensitivity '1877' for a Transmission channel 0 (Tx0), but, referring to FIG. 11B, the reception channel 3 receives a signal corresponding to a sensitivity '980' and thus, determines that the reception channel 3 is the input disable region.

According to various example embodiments, an operation method of an electronic device can include the operations of, if a damage of a touchscreen sensing a gesture is sensed, confirming a region in which the damage of the touchscreen does not occur, changing the size of an output screen based on the region in which the damage of the touchscreen does not occur, and outputting the size-changed output screen to the region in which the damage of the touchscreen does not occur.

According to various example embodiments, the operation of changing the size of the output screen can include the operation of changing the size of a screen composed of a predefined object for function execution.

According to various example embodiments, the operation of changing the size of the output screen can include the operation of changing the size of a screen composed of an object for executing a function related to communication of the electronic device.

According to various example embodiments, the operation of changing the size of the output screen can include the operation of changing the size of a screen composed of an object for executing at least one application additionally installed in the electronic device.

According to various example embodiments, the operation of changing the size of the output screen can include the operation of adding an object for function execution to the size-changed output screen.

According to various example embodiments, the operation of confirming the region in which the damage of the touchscreen does not occur can include the operation of confirming the region in which the damage of the touchscreen built in a cover glass arranged in the top of the electronic device does not occur.

According to various example embodiments, the operation of outputting the size-changed output screen to the region in which the damage does not occur can include the operation of outputting an output screen of a pop-up form.

The aforementioned constituent elements of the electronic device according to the present disclosure can be each composed of one or more components, and a name of the corresponding constituent element can be different according to the kind of the electronic device. The electronic device according to the present disclosure can include at least one of the aforementioned constituent elements, and can omit some constituent elements or further include additional other constituent elements. Also, some of the constituent elements of the electronic device according to the present disclosure are combined and constructed as one entity, thereby being able to identically perform the functions of the corresponding constituent elements before combination.

A constituent element term used in the present disclosure, for example, a "module" can represent, for example, a unit including a combination of one or more of hardware, software, and firmware. The "module" can be used interchangeably with terms of, for example, unit, logic, logical block, component, circuit or the like. The "module" can be a minimum unit of an integrally constructed component or a part thereof. The "module" can be also a minimum unit performing one or more functions or a part thereof. The "module" can be implemented mechanically or electronically. For example, the "module" according to the present disclosure can include at least one of an Application-Specific Integrated Circuit (ASIC) chip, Field—Programmable Gate Arrays (FPGAs) and a programmable-logic device performing some operations, which are known to the public or are to be developed in the future.

According to various example embodiments, at least part of an apparatus (e.g., modules or functions thereof) or method (e.g., operations) according to the present disclosure can be implemented by, for example, an instruction stored in a computer-readable storage media in a form of a programming module. If the instruction is executed by one or more processors, the one or more processors can perform a function corresponding to the instruction. The computer-readable storage media can be, for instance, a memory. At least part of the programming module can be implemented (e.g., executed) by, for example, the processor. At least part of the programming module can include, for example, a module, a program, a routine, a set of instructions, a process or the like for performing one or more functions.

The computer-readable recording media can include a magnetic media such as a hard disk, a floppy disk, and a magnetic tape, an optical media such as a Compact Disc-Read Only Memory (CD-ROM) and a Digital Versatile Disc (DVD), a Magneto-Optical Media such as a floptical disk, and a hardware device specially configured to store and perform a program instruction (e.g., the programming module) such as a Read Only Memory (ROM), a Random Access Memory (RAM), a flash memory and the like. Also, the program instruction can include not only a mechanical code such as a code made by a compiler but also a high-level language code executable by a computer using an interpreter and the like. The aforementioned hardware device can be constructed to operate as one or more software modules so as to perform an operation of the present disclosure, and vice versa.

The module or programming module according to the present disclosure can include at least one or more of the aforementioned constituent elements, or omit some of the aforementioned constituent elements, or include additional other constituent elements. Operations carried out by the module, the programming module or the other constituent elements according to the present disclosure can be executed in a sequential, parallel, repeated or heuristic method. Also, some operations can be executed in different order or can be omitted, or other operations can be added.

According to various example embodiments, in a storage media storing instructions, the instructions are set to enable at least one processor to perform at least one operation when the instructions are executed by the at least one processor. The at least one operation can include the operations of, if a damage of a touchscreen sensing a gesture is sensed, confirming a region in which the damage of the touchscreen does not occur, changing the size of an output screen based on the region in which the damage of the touchscreen does not occur, and outputting the size-changed output screen to the region in which the damage of the touchscreen does not occur.

An electronic device according to various example embodiments of the present disclosure changes a display region when an input disable region of a touchscreen exists, thereby being able to execute a function desired by a user though the touchscreen is damaged.

While the various embodiments have been shown and described with reference to certain embodiments thereof, it will be understood by those skilled in the art that various changes in form and details may be made therein without departing from the spirit and scope of the various embodiments as defined by the appended claims.

What is claimed is:

1. A method in an electronic device, the method comprising:
   if a damage to a touch screen is sensed, identifying a damaged region by the damage, and a non-damaged region;
   displaying, in at least part of the non-damaged region, a plurality of regions, each of the plurality of regions representing a region to which an object selected by a user can be added;
   in response to detecting a first user input selecting a region among the plurality of regions, displaying, in at least part of the non-damaged region, a list of functions executable by the electronic device;
   in response to detecting a second user input selecting a function among the list, adding an object used for executing the selected function to the selected region; and
   displaying the object used for executing the selected function in the selected region.

2. The method of claim 1, wherein the functions executable by the electronic device comprise a function related to a communication of the electronic device.

3. The method of claim 1, wherein the functions included in the list are predefined.

4. The method of claim 1, wherein the plurality of regions are blank regions.

5. The method of claim 1, wherein the functions included in the list comprise at least one necessary function and at least one additional function.

6. The method of claim 1, wherein the at least part of the non-damaged region in which the list of functions is displayed includes the at least part of the non-damaged region in which the plurality of regions are displayed.

7. The method of claim 1, wherein the plurality of regions are distinct from each other.

8. An electronic device comprising:
at least one processor configured to execute a plurality of instructions; and
a memory configured to store the plurality of instructions,
at least one program stored in the memory and configured to be executable by the at least one processor,
wherein the plurality of instructions, when executed by the at least one processor, cause the at least one processor to:
   if a damage to a touch screen is sensed, identify a damaged region by the damage, and a non-damaged region;
   display, in at least part of the non-damaged region, a plurality of regions, each of the plurality of regions representing a region to which an object selected by a user can be added;
   in response to detecting a first user input selecting a region among the plurality of regions, display, in at least part of the non-damaged region, a list of functions executable by the electronic device;
   in response to detecting a second user input selecting a function among the list, add an object used for executing the selected function to the selected region; and
   display the object used for executing the selected function in the selected region.

9. The device of claim 8, wherein the functions executable by the electronic device comprise a function related to communication of the electronic device.

10. The device of claim 8, wherein the plurality of instructions comprise instructions that, when executed by the at least one processor, cause the at least one processor to identify a damaged region of the touch screen based on a sensitivity variation of a signal generated through a transmission channel of the touch screen and a signal sensed in a reception channel.

11. The electronic device of claim 8, wherein the plurality of regions are blank regions.

12. The electronic device of claim 8, wherein the functions included in the list comprise at least one necessary function and at least one additional function.

13. The electronic device of claim 8, wherein the at least part of the non-damaged region in which the list of functions is displayed includes the at least part of the non-damaged region in which the plurality of regions are displayed.

14. The electronic device of claim 8, wherein the plurality of regions are distinct from each other.

15. A non-transitory computer-readable storage media storing one or more computer programs comprising computer readable code that, when executed by processing circuitry, causes the processing circuitry to:
   if a damage to a touch screen is sensed, identify a damaged region by the damage, and a non-damaged region;
   display, in at least part of the non-damaged region, a plurality of regions, each of the plurality of regions representing a region to which an object selected by a user can be added;
   in response to detecting a first user input selecting a region among the plurality of regions, display, in at least part of the non-damaged region, a list of executable functions;
   in response to detecting a second user input selecting a function among the list, add an object used for executing the selected function to the selected region; and
   display the object used for executing the selected function in the selected region.

* * * * *